US006536397B2

(12) United States Patent
Mizutani (10) Patent No.: US 6,536,397 B2
(45) Date of Patent: Mar. 25, 2003

(54) BONDING STRUCTURE OF VALVE SEAT AND METHOD OF MAKING THE SAME

(75) Inventor: Nobuo Mizutani, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/068,197

(22) Filed: Feb. 6, 2002

(65) Prior Publication Data

US 2002/0121259 A1 Sep. 5, 2002

(30) Foreign Application Priority Data

Feb. 8, 2001  (JP) ........................................ 2001-031863

(51) Int. Cl.$^7$ ................................................ F02N 3/00
(52) U.S. Cl. ................................... 123/188.8; 29/888.44
(58) Field of Search ...................... 123/188.8; 29/888.44

(56) References Cited

U.S. PATENT DOCUMENTS 5,848,579 A    12/1998    Adachi et al. ........... 123/188.8

FOREIGN PATENT DOCUMENTS

| JP | 1-84887 | 6/1989 |
| JP | 08-105309 | 4/1996 |
| JP | 11-050823 | 2/1999 |
| JP | 2000-263241 | 9/2000 |

Primary Examiner—Noah P. Kamen
(74) Attorney, Agent, or Firm—Woodcock Washburn LLP (57) ABSTRACT

A bonding structure of a valve seat has a port opening of a metallic head and an annular metallic valve seat insert. The valve seat insert includes an outer reduced diameter surface on its outer circumference. The material of the valve seat insert is harder than that of the head. The head plastically deforms upon pressing the valve seat insert toward the head. The deformed metal occupies any gap around the outer reduced diameter surface.

12 Claims, 9 Drawing Sheets

BONDING STRUCTURE OF VALVE SEAT AND METHOD OF MAKING THE SAME

BACKGROUND OF THE INVENTION

The present invention relates to a bonding structure of a valve seat and more particularly to structure and method for bonding the valve seat insert to a head by pressure welding such that the head physically secures the valve seat insert for forming the valve seat for an internal combustion engine.

In a general valve for an internal combustion engine, an annular valve seat insert is made of a sintered ferroalloy, and the intake and exhaust port openings of a cylinder head are made of an aluminum alloy. The valve seat insert is bonded to the cylinder head by heating and pressing the valve seat insert into a recess formed at each port opening.

In this heating and pressing process, the annular valve seat insert is required to be relatively thick to counter internal stress generated due to shrink. Therefore, bonding the valve seat insert by welding or others, which generates less internal stress, has been tried such that the valve seat insert becomes relatively thin. Japanese Unexamined Patent Publication No. 11-50823 discloses that the valve seat insert is bonded by friction welding, which applies an ultrasonic vibration. Also, Japanese Unexamined Patent Publication No. 8-296417 and No. 2000-263241 disclose that the valve seat insert is bonded by electric resistance welding.

By utilizing any way, since the cylinder head made of an aluminum alloy and the valve seat insert made of a sintered ferroalloy, which are different materials, are bonded, a weak intermetallic compound and an oxidized layer are produced at a transition region between the cylinder head and the valve seat insert, thus weakening the bonding strength therebetween. Therefore, to increase the bonding strength, the valve seat insert itself may contain a diffusible material, which is diffusible to an aluminum alloy, or may includes a layer of the diffusible material, or solder may be interposed between the cylinder head and the valve seat insert.

In the above-mentioned bonding structure of the valve seat bonded by friction welding or by electric resistance welding ensures degree of freedom to design, for example, thickness of the valve seat insert may be relatively thin. However, the structure does not completely retard the valve seat insert from falling out.

SUMMARY OF THE INVENTION

The present invention addresses the above-mentioned problems traceable to the bonding strength between a head and a valve seat insert by improving a bonding structure such that the head physically secures the valve seat insert.

According to the present invention, a bonding structure of a valve seat has a port opening of a metallic head and an annular metallic valve seat insert. The valve seat insert includes an outer reduced diameter surface on its outer circumference. The material of the valve seat insert is harder than that of the head. The head plastically deforms upon pressing the valve seat insert toward the head. The deformed head occupies any gap around the outer reduced diameter surface.

The present invention also provides a method of making a valve seat. The method includes pressing a valve seat insert, which provides an outer reduced diameter surface, toward a head, rotating the valve seat insert while pressing the valve seat insert, and cooling the valve seat insert and the head.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

A first embodiment of the present invention will now be described with reference to FIGS. 1 through 3.

Figure 1:
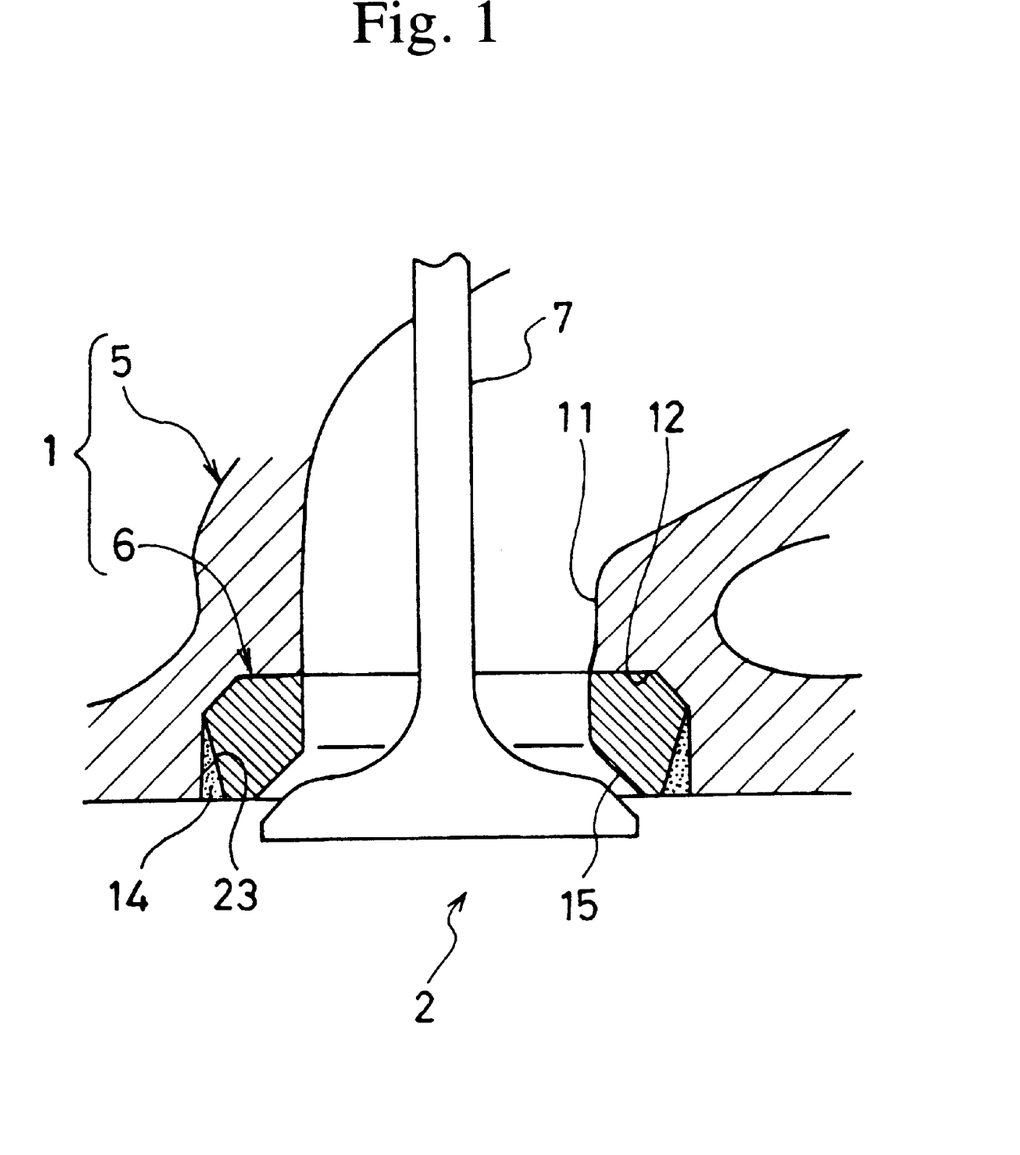
FIG. 1 is a cross-sectional view of a valve seat insert and a cylinder head, which are assembled to a valve mechanism for an internal combustion engine after bonding according to a first embodiment of the present invention.

As shown in FIG. 1, a bonding structure 1 of a valve seat is constituted of a cylinder head 5 and an a valve seat insert 6. A recess 12 is formed at the end of the port opening 11 of the cylinder head 5 by pressing the valve seat insert 6 toward the cylinder head 5. The valve seat insert 6, which is annular in shape, is bonded to the cylinder head 5 so as to be fitted into the recess 12. An inclined surface 23 as an outer reduced diameter surface, which gradually reduces its diameter toward the opposite side of the cylinder head 5, resides on an outer circumference of the valve seat insert 6. A deformed metal 14, the cross section of which is wedge-shaped, occupies any gap around the inclined surface 23, and is solidified. The deformed metal is softened by increasing its temperature, and is fluidized. An inner periphery of the valve seat insert 6 facing a combustion chamber, or the opposite side of the cylinder head 5, is machined to a tapered surface with an angle of 45 degrees relative to the central axis of the port opening 11, thus forming a valve seat 15. In the bonding structure 1 of the valve seat, the valve body 7 is disposed on the valve seat 15 so as to move up and down relative to the valve seat 15 of the valve seat insert 6. Thereby, a valve 2 for an internal combustion engine is constructed.

Figure 2:
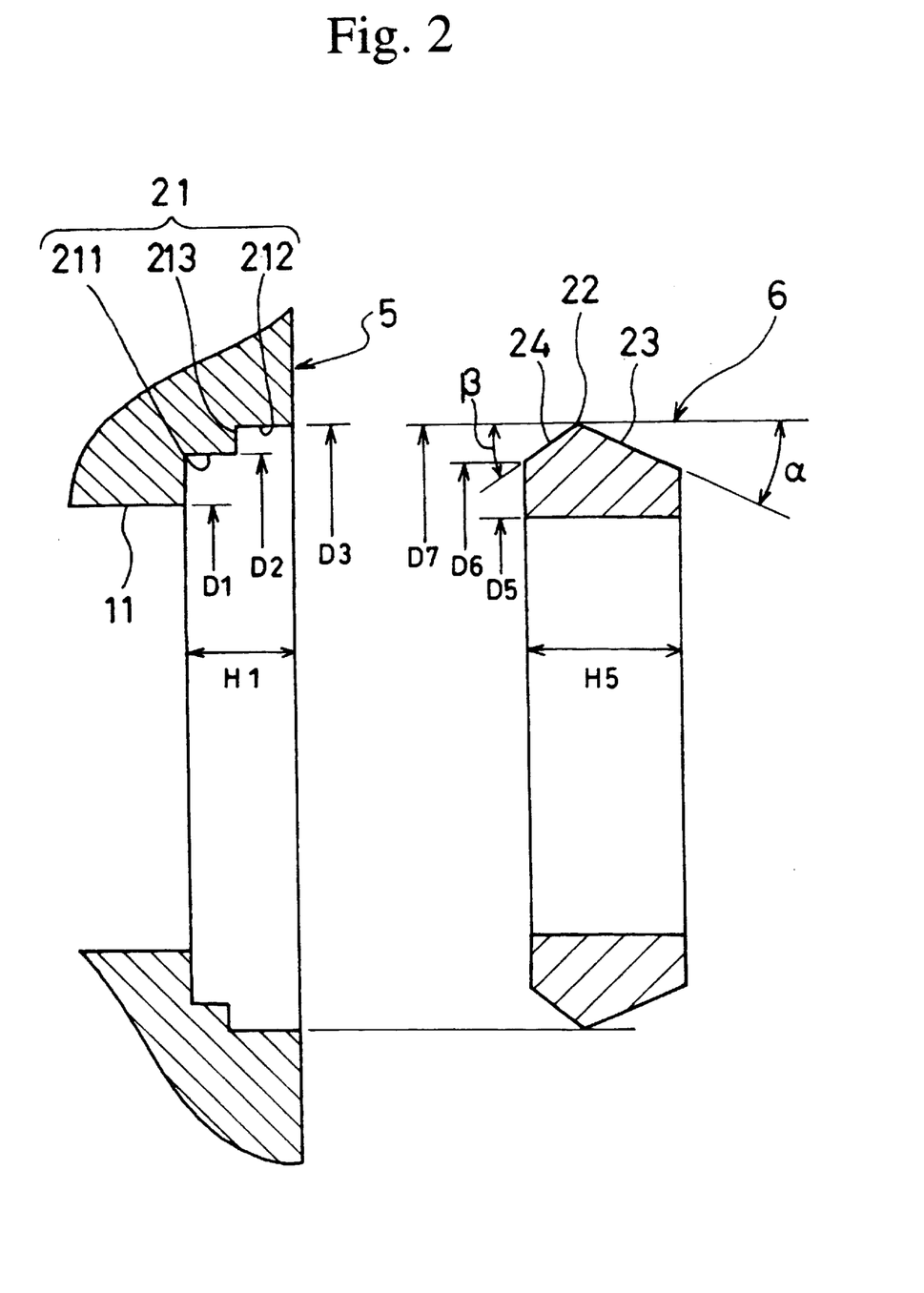
FIG. 2 is an enlarged partial cross-sectional view of a valve seat insert and a cylinder head before bonding according to the first embodiment of the present invention.

FIG. 2 shows a valve seat insert and a cylinder head before bonding. The cylinder head 5 is made of a metal such as an aluminum alloy, for example, Al—Si. The valve seat insert 6 is made of a metal such as a ferroalloy or a sinter of those alloys. The material of the valve seat insert 6 is harder than that of the cylinder head 5.

The recess 21 of the cylinder head 5 is constituted of a first recess 211, the diameter D2 of which is larger than the diameter D1 of the port opening 11, a second recess 212, the diameter D3 of which is much larger than the diameter D2 of the first recess 211, and a step 213 between the first recess 211 and the second recess 212.

The valve seat insert 6 is annular in shape, and has an inside diameter of D5, an outermost outside diameter of D7 and a thickness of H5. The valve seat insert 6 provides a truncated cone-shaped first inclined surface 23, or an outer reduced diameter surface, which is positioned farther from the cylinder head 5 than an outermost point 22 of the valve seat insert 6. The valve seat insert 6 also provides a truncated cone-shaped second inclined surface 24, which is positioned closer to the cylinder head 5 than the outermost point 22. Since the deformed metal shaped into a wedge occupies the gap around the first inclined surface 23, the angle α of the first inclined surface 23 is preferably 10 to 15 degrees. Also, since the second inclined surface 24 forces the deformed metal out to the first inclined surface 23, the angle β of the second inclined surface 24 is preferably 45 degrees or below.

The outermost outside diameter D7 of the vale seat insert 6 is preferably a little smaller than the diameter D3 of the second recess 212 so that the deformed metal smoothly flows onto the first inclined surface 23. In the valve seat insert 6, and the bottom diameter D6 of an end surface facing the cylinder head 5 is preferably a little smaller than the diameter D2 of the first recess 211 so that the second inclined surface 24 abuts against the edge of the step 213. The diameter D5 of the valve seat insert 6 is preferably a little smaller than the diameter D1 of the port opening 11 so as to guide a burr of the deformed metal. The thickness H5 of the valve seat insert 6 is preferably a little larger than the depth H1 of the recess 21 so as to save a leave for upsetting upon pressing.

Figure 3:
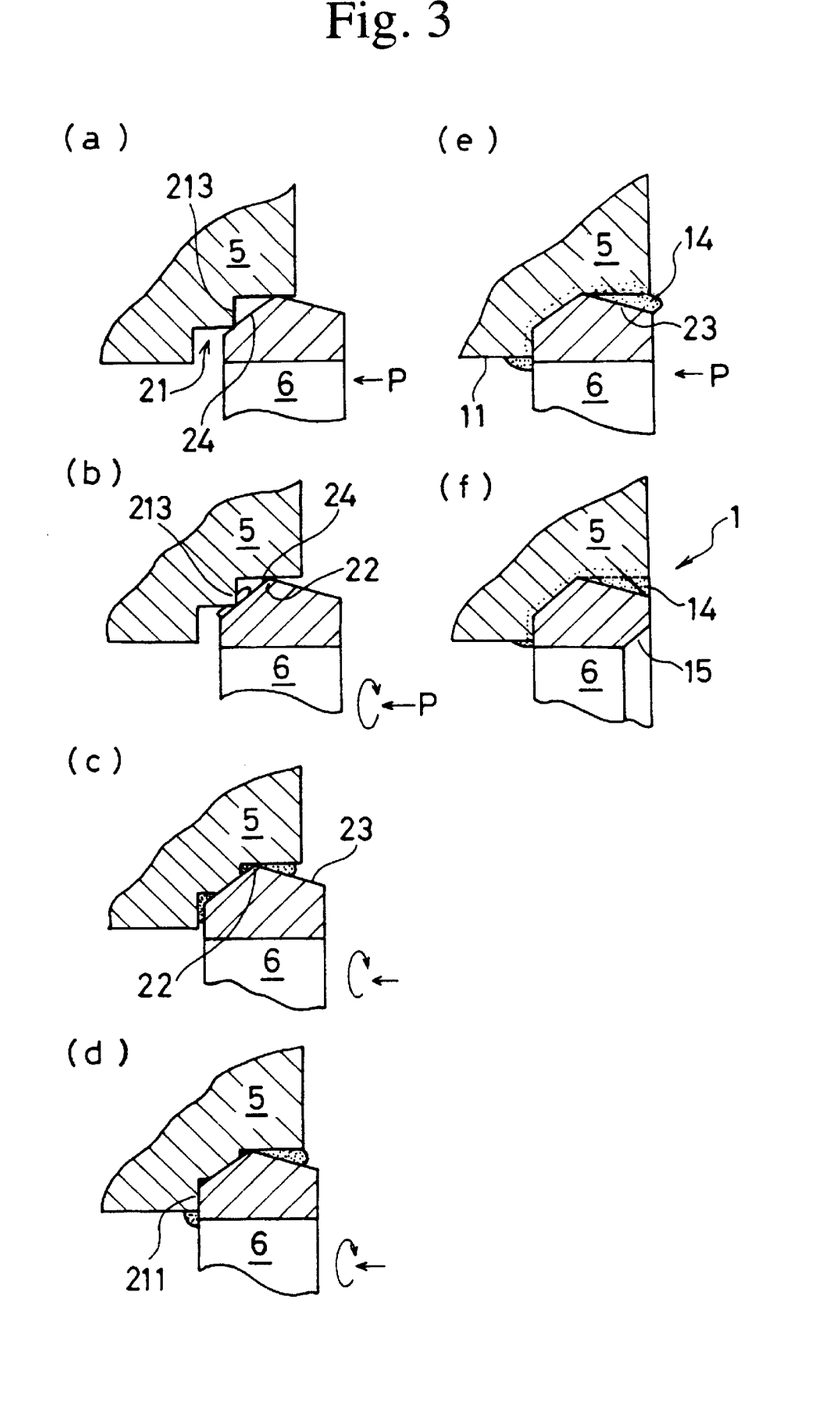
FIGS. 3a through 3f are partial cross-sectional views of a procedure for bonding a valve seat insert to a cylinder head according to the first embodiment of the present invention.

FIG. 3 shows a procedure for bonding a valve seat insert 6 and a cylinder head 5. The valve seat insert 6 is pressed toward the cylinder head 5 with its rotated. As shown in FIG. 3a, the valve seat insert 6 is fitted into the recess 21 of the cylinder head 5. The edge of the step 213 abuts against the second inclined surface 24. In such a state, the valve seat insert 6 is pressed against the cylinder head 5 by applying predetermined pressure P to the valve seat insert 6. As shown in FIG. 3b, as the valve seat insert 6 is pressed with its rotated, the edge of the step 213 is deformed, and flows along the second inclined surface 24.

As shown in FIG. 3c, the deformed metal forced out to the outermost point 22 crosses the outermost point 22, and flows along the first inclined surface 23 toward the opposite side of the cylinder head 5. As shown in FIG. 3d, the end of the valve seat insert 6 facing the cylinder head 5 abuts against the bottom of the first recess 211 of the cylinder head 5, and continues to be pressed against the cylinder head 5 with its rotated until the deformed metal occupies any gap around the first recess 211. As shown in FIG. 3e, the valve seat insert 6 is stopped rotating, and is upset by pressing. As the cylinder head 5 abutting against the valve seat insert 6 is deformed, the valve seat insert 6 is further pushed in. The deformed metal is forced out onto the first inclined surface 23 and to the port opening 11.

Cooled in a state of FIG. 3e, the wedge-shaped deformed metal 14 around the first inclined surface 23 of the valve seat insert 6 is solidified. The solidified deformed metal 14 occupies any gap around the valve seat insert 6, and physically secures the valve seat insert 6 to the cylinder head 5. As shown in FIG. 3f, the bonding structure 1 of the valve seat with designed dimensions is made by the following steps: removing a burr of the deformed metal 14 by machining the inner surface of the valve seat insert 6 and the distal end of the valve seat insert relative to the cylinder head 5; and forming the valve seat 15 by machining the edge between the distal end and the inner surface.

In FIG. 3f, if the deformed metal 14 does not occupy the gap around the first inclined surface 13 enough, the deformed metal 14 after removing the burr is defectively formed with some gaps. Therefore, the valve seat 15 firmly secured is selected based on its appearance test.

Figure 4:
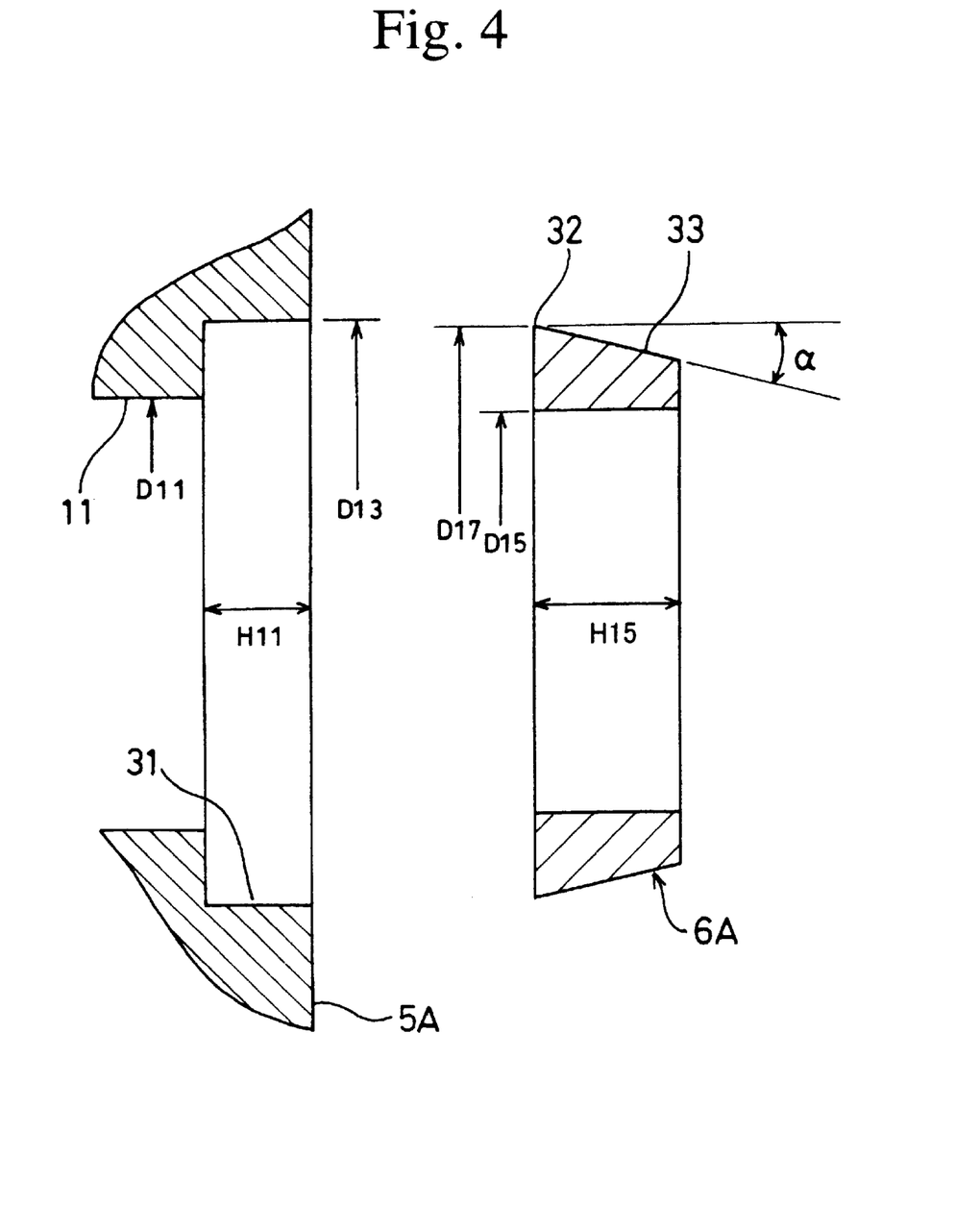
FIG. 4 is a cross-sectional view of a valve seat insert and a cylinder head before bonding according to a second embodiment of the present invention.

A second embodiment of the present invention will now be described with reference to FIGS. 4 and 5.

A cylinder head 5A provides a recess 31, which is D13 in diameter and H11 in depth, and the diameter D13 is larger than the diameter D11 of the port opening 11. A valve seat insert 6A is annular in shape, and is D15 in inside diameter, D17 in outermost outside diameter and H15 in thickness. The valve seat insert 6A also provides a truncated cone-shaped inclined surface 33 or an outer reduced diameter surface on its outer circumference, the angle of the inclined surface 33 is α degree perpendicular to the central axis of the port opening 11. The inclined surface 33 is positioned farther from the cylinder head 5A than an outermost point 32 of the valve seat insert 6A.

The outermost outside diameter D17 of the vale seat insert 6A is preferably a little smaller than the diameter D13 of the recess 31 so that the deformed metal smoothly flows onto the inclined surface 33. The diameter D15 of the valve seat insert 6A is preferably a little smaller than the diameter D11 of the port opening 11 so as to guide a burr of the deformed metal. The thickness H1 5 of the valve seat insert 6A is preferably a little larger than the depth H11 of the recess 31 so as to save a leave for upsetting upon pressing.

Figure 5:
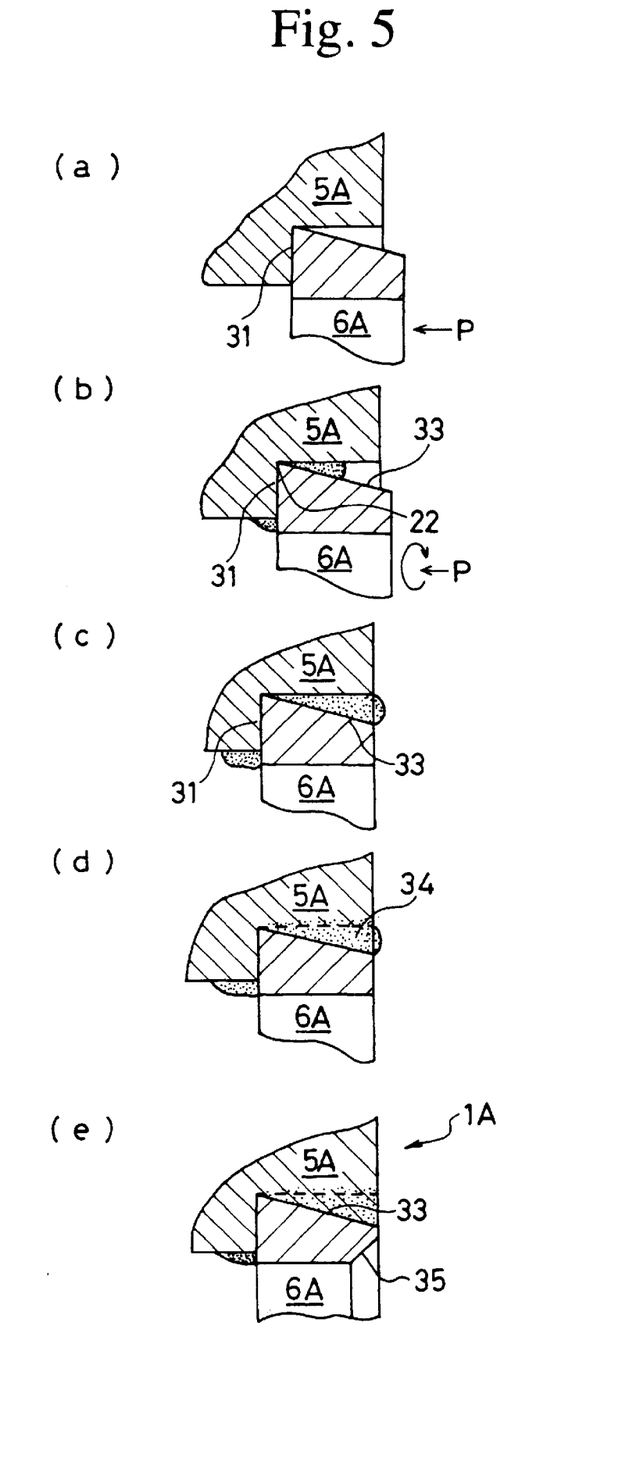
FIGS. 5a through 5e are cross-sectional views of a procedure for bonding a valve seat insert to a cylinder head according to the second embodiment of the present invention.

FIG. 5 shows a procedure for bonding a valve seat insert 6A to a cylinder head 5A. The valve seat insert 6A is pressed toward the cylinder head 5A with its rotated. As shown in FIG. 5a, the valve seat insert 6A is fitted into the recess 31 of the cylinder head 5A. The end of the valve seat insert 6A abuts against the bottom of the recess 31. In such a state, the valve seat insert 6A is pressed against the cylinder head 5A by applying predetermined pressure P to the valve seat insert 6A. As shown in FIG. 5b, as the valve seat insert 6A is pressed with its rotated, the bottom of the recess 31 is deformed, and the deformed metal crosses the outermost point 22, then flows along the inclined surface 33.

As shown in FIG. 5c, the valve seat insert 6A is stopped rotating, and continues to be pressed. Since the bottom of the cylinder head 5A abutting against the valve seat insert 6A is deformed, the valve seat insert 6A is further pushed in. The deformed metal is forced out onto the inclined surface 33, and is shaped into a wedge. As shown in FIG. 5d, the wedge-shaped deformed metal 34 is solidified by cooling, and is united with a base metal of the cylinder head 5A. The wedge-shaped deformed metal 34 occupies any gap around the valve seat insert 6A, and physically secures the valve seat insert 6A to the cylinder head 5A. As shown in FIG. 5e, the bonding structure 1A of the valve seat with designed dimensions is made by the following steps: removing a burr of the deformed metal 34 by machining the inner surface of the valve seat insert 6A and the distal end of the valve seat insert 6A relative to the cylinder head 5A; and forming the valve seat 35 by machining the edge between the distal end and the inner surface.

In FIG. 5e, if the deformed metal 34 does not occupy the gap around the inclined surface 33 enough, the deformed metal 34 is defectively formed with some gaps after removing the burr. Therefore, the firmly secured valve seat 35 is is selected based on its appearance test.

A third embodiment of the present invention will now be described with reference to FIG. 6.

Figure 6:
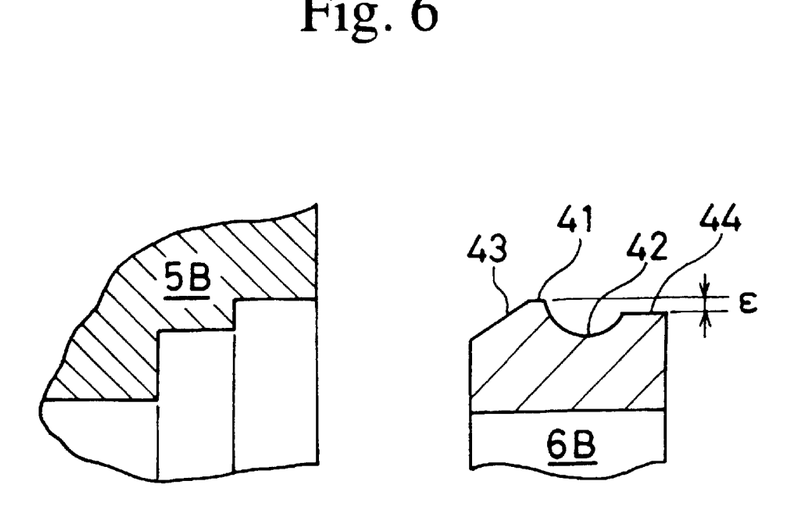
FIG. 6 is a cross-sectional view of a valve seat insert and a cylinder head before bonding according to a third embodiment of the present invention.

As shown in FIG. 6, the shape of the cylinder head 5B is the same as that in the first embodiment. A valve seat insert 6B provides an inclined surface 43 and an outer reduced diameter surface 42 on its outer circumference. The inclined surface 43 is positioned closer to the cylinder head 5B than an outermost surface 41 of the valve seat insert 6B, as well as that in the first embodiment. The outer reduced diameter surface 42, which is semicircular in shape, is positioned farther from the cylinder head 5B than the outermost surface 41. The valve seat insert 6B also provides a cylindrical surface 44, the diameter of which is smaller than the diameter of the outermost surface 41, on its outer circumference. The cylindrical surface 44 is positioned farther from the cylinder head 5B than the outer reduced diameter surface 42. A clearance $\epsilon$ is set between the cylindrical surface 44 and the outermost surface 41.

As well as those in the first embodiment, the deformed metal flows along the inclined surface 43, and crosses the outmost surface 41, then occupies any gap around the outer reduced diameter surface 42. The deformed metal occupying the gap around the outer reduced diameter surface 42 is solidified, and is united with a base metal of the cylinder head 5B. Also, since the deformed metal occupying the gap around the outer reduced diameter surface 42 is forced out through the clearance $\epsilon$, and is exposed outside. Therefore, the outer reduced diameter surface 42 filled with the deformed metal is checked based on its appearance.

A fourth embodiment of the present invention will now be described with reference to FIG. 7.

Figure 7:
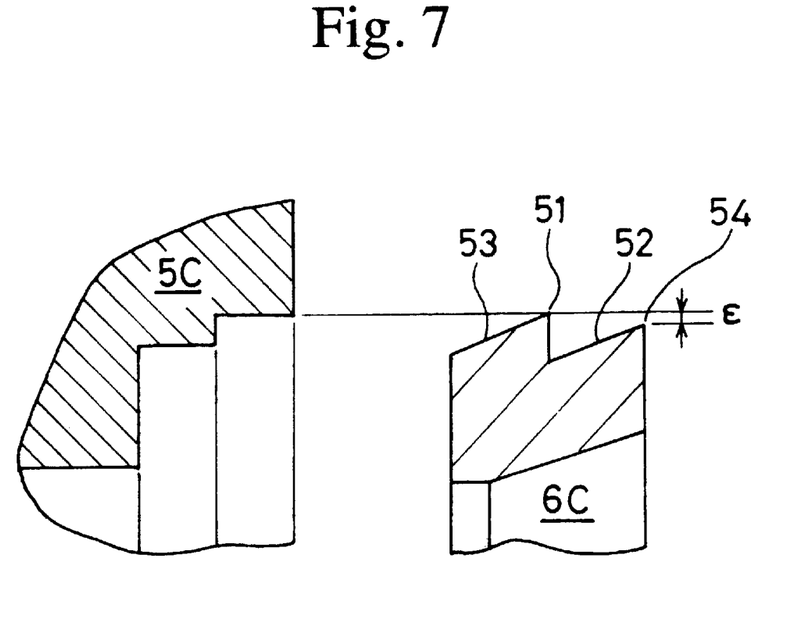
FIG. 7 is a cross-sectional view of a valve seat insert and a cylinder head before bonding according to a fourth embodiment of the present invention.

As shown in FIG. 7, the shape of the cylinder head 5C is the same as that in the first embodiment. A valve seat insert 6C provides an inclined surface 53 and an outer reduced diameter surface 52 on its outer circumference. The inclined surface 53 is positioned closer to the cylinder head 5C than an outermost point 51 of the valve seat insert 6C, as well as that in the first embodiment. The outer reduced diameter surface 52, which is a catch, is positioned farther from the cylinder head 5C than the outermost point 51. The valve seat insert 6C also provides another peak point 54, the diameter of which is smaller than the diameter of the outermost point 51, on its outer circumference. The peak point 54 is positioned farther from the cylinder head 5C than the outer reduced diameter surface 52. A clearance $\epsilon$ is set between the peak point 54 and the outermost point 51.

As well as those in the first embodiment, the deformed metal flows along the inclined surface 53, and crosses the outmost point 51, then occupies any gap around the outer reduced diameter surface 52 as a catch. The deformed metal occupying the gap around the outer reduced diameter surface 52 is solidified, and is united with a base metal of the cylinder head 5C. Also, since the deformed metal occupying the gap around the outer reduced diameter surface 52 is forced out through the clearance $\epsilon$, the outer reduced diameter surface 52 filled with the deformed metal is checked based on its appearance.

A fifth embodiment of the present invention will now be described with reference to FIG. 8.

Figure 8:
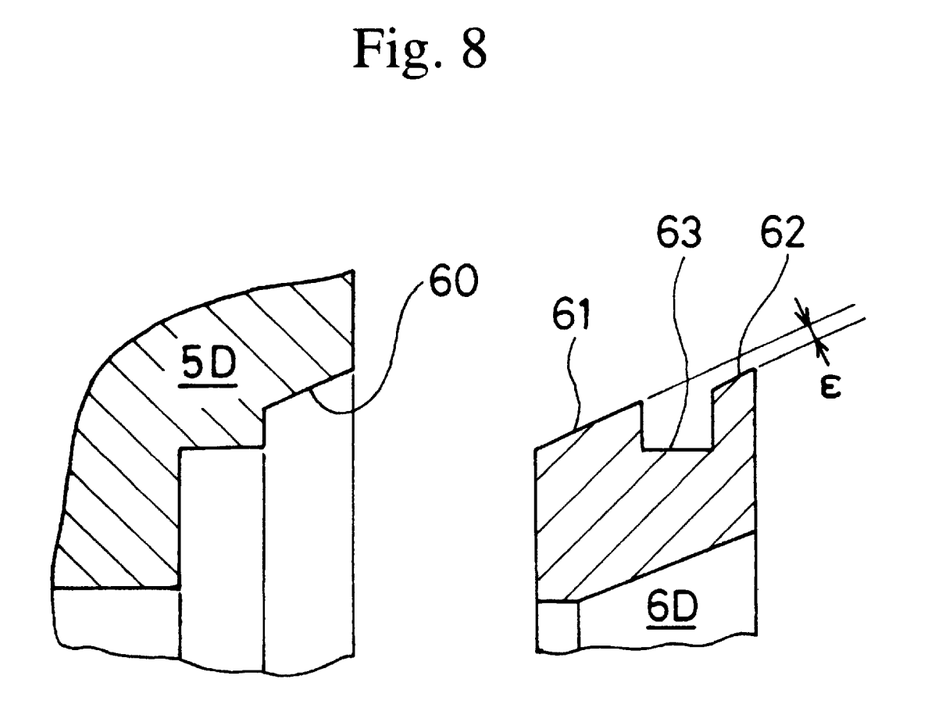
FIG. 8 is a cross-sectional view of a valve seat insert and a cylinder head before bonding according to a fifth embodiment of the present invention.

As shown in FIG. 8, the shape of the cylinder head 5D is the same as that in the first embodiment except that the second recess is a truncated cone-shaped recess 60. A valve seat insert 6D provides a first inclined surface 61 and a second inclined surface 62 on its outer circumference. The first and second inclined surfaces 61, 62, which are truncated cone-shaped, are positioned on the outer circumference of the valve seat insert 6D. The valve seat insert 6D also provides an outer reduced diameter surface 63 as a catch, which is an annular groove. The outer reduced diameter surface 63 is positioned between the first and second inclined surfaces 61, 62, and provides a step for inhibiting the valve seat insert 6D from falling out. A clearance $\epsilon$ is set between the first and second inclined surfaces 61, 62.

As well as those in the first embodiment, the deformed metal flows along the inclined surface 61, and occupies any gap around the outer reduced diameter surface 63. The deformed metal occupying the gap around the outer reduced diameter surface 63 is solidified, and is united with a base metal of the cylinder head 5D. Also, since the deformed metal occupying the gap around the outer reduced diameter surface 63 is forced out through the clearance $\epsilon$, the outer reduced diameter surface 63 filled with the deformed metal is checked based on its appearance.

A sixth embodiment of the present invention will now be described with reference to FIGS. 9a through 9c.

Figure 9:
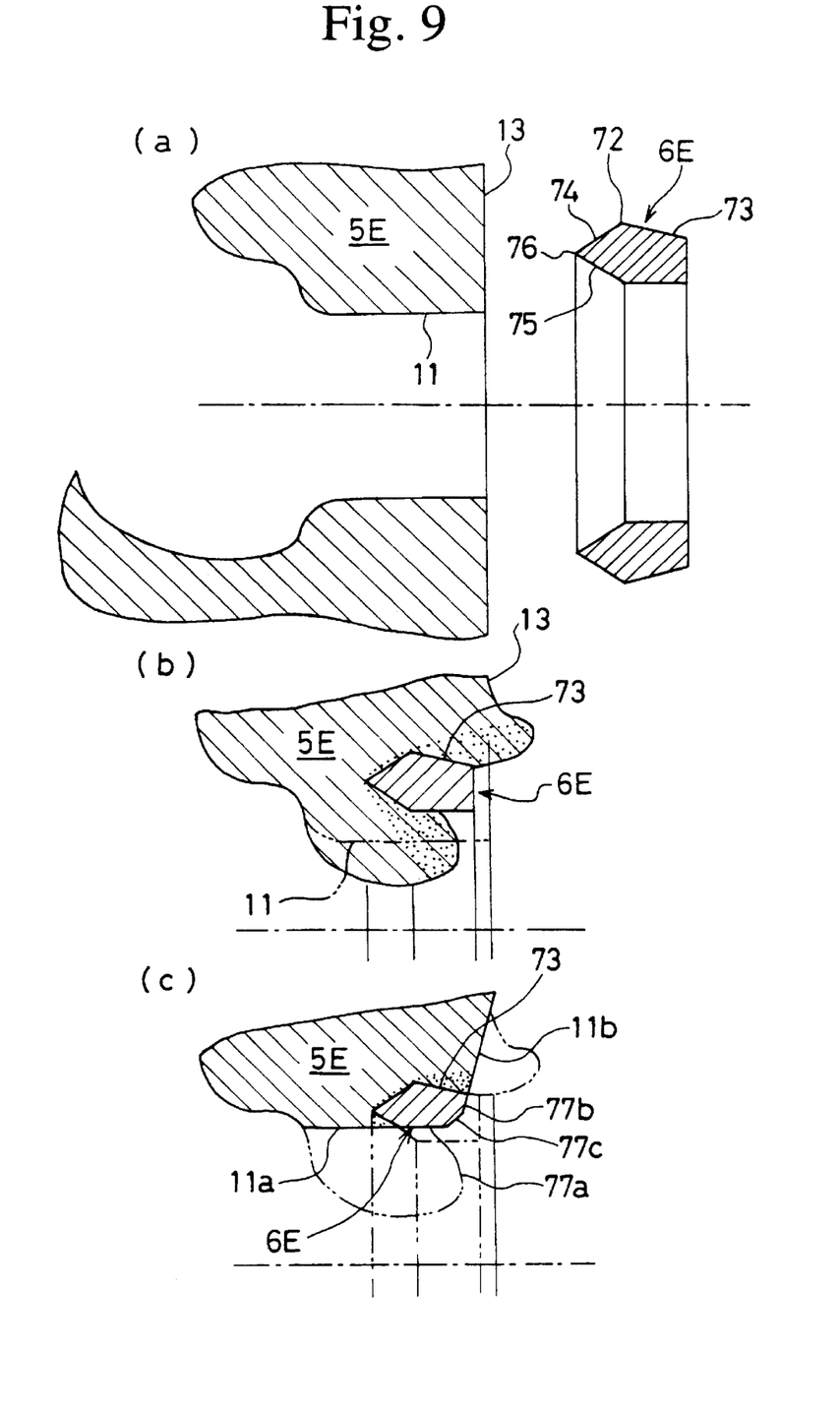
FIGS. 9a through 9c are cross-sectional views of a valve seat insert and a cylinder head before bonding, and a procedure for bonding the valve seat insert to the cylinder head according to a sixth embodiment of the present invention.

As shown in FIG. 9a, the cylinder head 5E remains its shape after casting without machining for forming a recess at the port opening 11. A valve seat insert 6E provides a first inclined surface 73 as an outer reduced diameter surface and a second inclined surface 74 on its outer circumference. The first inclined surface 73, which is truncated cone-shaped, is positioned farther from the cylinder head 5E than an outermost point 72 of the valve seat insert 6E. The second inclined surface 74, which is truncated cone-shaped, is positioned closer to the cylinder head 5E than the outermost point 72. The valve seat insert 6E also provides a third inclined surface 75 on its inner circumference, and has an edge 76 on one end.

In FIG. 9b, as the valve seat insert 6E is pressed toward the cylinder head 5E with its rotated, the port opening 11 and the end surface 13 of the cylinder head 5E are deformed, and the deformed metal are forced out. Due to the forced out deformed metal, the deformed metal occupies any gap around the first inclined surface 73 enough. In FIG. 9c, a valve seat 77c is formed by the following steps: forming the port opening 11 by machining the inner surface 11a of the cylinder head 5E and the inner surface 77a of the valve seat insert 6E together; forming a plate-shaped end by machining the end 11b of the cylinder head 5E and the end 77b of the valve seat insert 77b together; and machining the edge between the inner surface 77a and the end 77b.

In FIG. 9c, the deformed metal occupies the gap around the first inclined surface 73 enough, and the first inclined surface 73 filled with the deformed metal is checked after machining based on its appearance.

A seventh embodiment of the present invention will now be described with reference to FIGS. 10a through 10c.

Figure 10:
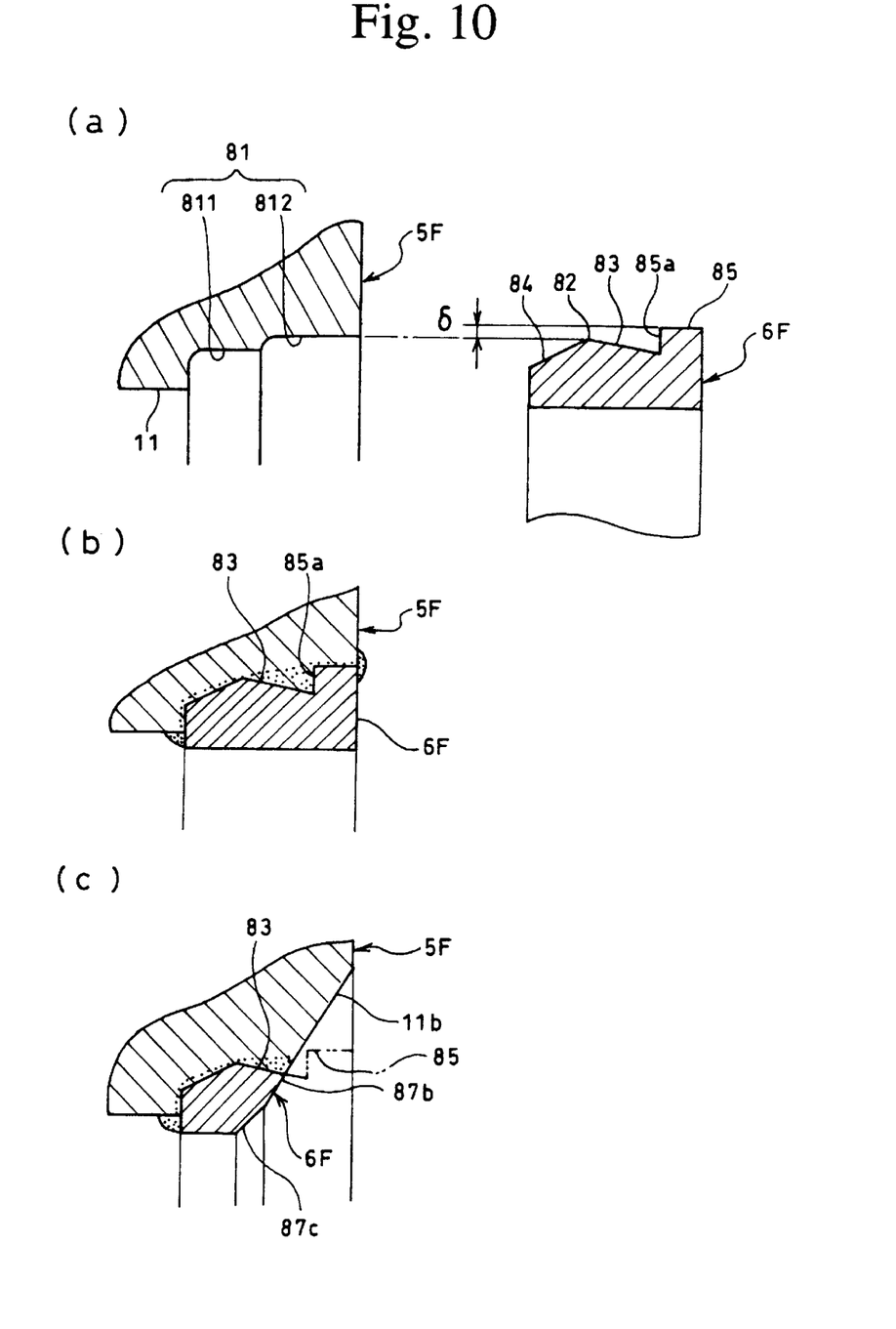
FIGS. 10a through 10c are cross-sectional views of a valve seat insert and a cylinder head before bonding, and a procedure for bonding the valve seat insert to the cylinder head according to a seventh embodiment of the present invention.

In FIG. 10a, the cylinder head 5F provides a recess 81 at the end of the port opening 11, and the recess 81 is constituted of a first recess 811 and a second recess 812. A valve seat insert 6F provides a first inclined surface 83 as an outer reduced diameter surface and a second inclined surface 84, on its outer circumference. The first inclined surface 83, which is truncated cone-shaped, is positioned farther from the cylinder head 5F than a peak point 82 of the valve seat insert 6F. The second inclined surface 84, which is truncated cone-shaped, is positioned closer to the cylinder head 5F than the peak point 82. The valve seat insert 6F also provides a cap portion 85 and a step 85a. The cap portion 85 is positioned at the distal end of the valve seat insert 6F relative to the cylinder head 5F. The step 85a is positioned between the first inclined surface 83 and the cap portion 85. The diameter of the peak point 82 is substantially equal to the diameter of the second recess 812. The diameter of the cap portion 85 is larger than the diameter of the peak point 82, A clearance δ is set between the cap portion 85 and the peak point 82.

In FIG. 10b, as the valve seat insert 6F is pressed toward the cylinder head 5F with its rotated, the deformed metal flows onto the first inclined surface 83 of the valve seat insert 6F, and is blocked by the cap portion, thus promoting the deformed metal occupies any gap around the first inclined surface 83.

In FIG. 10c, a valve seat 87c is formed by the following steps: forming a plate-shaped end by machining the end 11b of the cylinder head 5F and the end is 87b of the valve seat insert 6F together; simultaneously removing a portion corresponding to the cap portion 85 of the valve seat insert 6F; and machining the edge between the inner surface of the valve seat insert 6F and the end 87b.

In FIG. 10c, the deformed metal occupies the gap around the first inclined surface 83 enough, and the first inclined surface 83 filled with the deformed metal is checked after machining based on its appearance.

According to the embodiments described above, the following advantageous effects are obtained.

(1) In the first through seventh embodiments, the deformed metal made of the cylinder heads occupy any gap around the inclined surfaces 23, 33, 73, 83 as an outer reduced diameter surface, and around the outer reduced diameter surfaces 42, 52, 63 as a catch, and are united with the base metals of the cylinder heads. Thereby, the valve seat inserts are physically secured to the cylinder heads. Accordingly, a bonding structure by friction welding, which has been a difficult task in its bonding strength, is applied. As the bonding structure physically secured by friction welding is applied, limitation on materials adopted to the bonding surface of the valve seat inserts may be reduced. Furthermore, the valve seat inserts may be thinner as compared with those made by pressure welding, and design requirements about dimensions and materials of the valve seat inserts may be improved.

(2) In the first through seventh embodiments, since the deformed metal occupying the gaps around the inclined surfaces 23, 33, 73, 83 as an outer reduced diameter surface, or the outer reduced diameter surfaces 42, 52, 63 as a catch, flow along the inclined surfaces 23, 33, 73, 83, or flow through the clearance ε, and are exposed outside, bonding including physical secureness is checked based on their appearances. Thereby, all of the valve seats are easily checked, and the firmly secured valve seats may only be products.

(3) In the first, second, sixth and seventh embodiments, since the outer reduced diameter surfaces are the inclined surfaces 23, 33, 73, 83, the deformed metal occupying the gaps around the inclined surfaces 23, 33, 73, 83 is wedge-shaped. Thereby, the valve seat inserts are physically secured to the cylinder heads.

(4) In the first, third through fifth embodiments, the valve seat inserts provide the inclined surfaces 24, 43, 53, 61 on their outer circumference. The inclined surfaces 24, 43, 53, 61 abut against steps, one of which is the step 213 shown in FIG. 2, and the cylinder heads are deformed. Thereby, thrust force upon starting friction welding is reduced. Also, the deformed metal flows along the inclined surfaces 24, 43, 53, 61, then to the inclined surface 23 as an outer reduced diameter surface, or the outer reduced diameter surfaces 42, 52, 63 as a catch. Thereby, the deformed metal surely occupies the gaps around the valve seat inserts.

(5) In the first and second embodiments, since the shapes of the outer circumference of the valve seat inserts are constituted of two inclined surfaces or one inclined surface, the valve seat inserts 6, 6A made of a metal such as a sintered metal is easily formed. Particularly, the shape of the valve seat insert 6A in the second embodiment only provides one inclined surface on its outer circumference so that the inclined surface is easily formed.

(6) In the first through seventh embodiments, any cylinder heads are deformed due to friction welding. Factors such as speed, pressure and the amount of upsetting for friction welding may be controlled easier than that of current control for electric resistance welding, with a consequence of high reproducibility, stabilized quality and production equipment with, a simple structure.

(7) In the first through seventh embodiments, as the cylinder heads are deformed due to friction welding, part of the cylinder heads abutting against the valve seat inserts are effected by puddling upon welding. Thereby, toughness of the cylinder heads may be improved. Consequently, mechanical characteristic of the base metal supporting the valve seat inserts improves, and durability of the valve seat inserts against a shock generated upon opening and closing valves improves as a whole. Particularly, in the valve for an internal combustion engine, since a shock upon opening and closing the valve is large, disposing tough materials around the valve seat inserts is preferable.

(8) In the fourth and fifth embodiments, the openings of the valve seat inserts 6C, 6D may increase their diameter toward their one end, while the outer circumferences of the valve seat inserts 6C, 6D may increase their diameter toward their one end. In such a state, since the valve seat inserts 6C, 6D provide the outer reduced diameter surfaces 52, 63 as a catch on their outer circumferences, the valve seat inserts 6C, 6D may physically be secured to the cylinder heads 5C, 5D. Since the deformed metal occupying the gaps around the outer reduced diameter surfaces 52, 63 is exposed outside, the outer reduced diameter surfaces 52, 63 filled with the deformed metal are checked based on their appearances.

(9) In the sixth embodiment, since one end of the valve seat insert 6E provides the edge 76, initial thrust force for deforming the cylinder head 5E may be reduced upon pressing the valve seat insert 6E against the end surface 13 of the cylinder head 5E synchronously with rotating the valve seat insert 6E. Thereby, a general numericallycontrolled machine or an NC machine may achieve friction welding without using a special friction welding machine. Also, since the valve seat insert 6E is pressed into the port opening 11 of the cylinder head 5E without forming a recess around the end of the port opening 11, a relatively large amount of cylinder head 5E is deformed. Thereby, the deformed metal occupies any gap around the first inclined surface 73 enough, and is shaped into a wedge, then solidifies.

(10) In the seventh embodiment, the valve seat insert 6F provides the cap portion 85 on its distal end relative to the cylinder head 5F. Thereby, the cap portion 85 dams off the deformed metal flowed onto the first inclined surface 83, and the deformed metal occupies any gap around the first inclined surface 83 enough, and is shaped into a wedge, then solidifies. The wedge-shaped deformed metal occupying the gap around the first inclined surface 83 is exposed outside by removing the cap portion 85 by machining. Therefore, the wedge-shaped deformed metal occupying the gap is checked based on its appearance.

The present invention is not limited to the embodiments described above, but may be modified into the following examples.

(1) In the first through seventh embodiments, the cylinder head is deformed due to friction welding by a rotary pressing. However, the cylinder head may be deformed due to friction welding by pressing an ultrasonic vibrator. In such a state, the valve seat insert is pressed and vibrated by pressing a vibrating hone thereon.

(2) In the first through seventh embodiments, the cylinder head is made of an aluminum alloy, and the valve seat insert is made of a sintered alloy. However, the cylinder head may be forged iron or cast iron, while the valve seat insert may be a harder metal relative to the cylinder head, including tungsten carbide. In other words, the valve seat insert is harder than the cylinder head, and the material of the cylinder head may be deformed upon pressing the valve seat insert.

(3) In the first through seventh embodiments, the present invention is applied to the valve for an internal combustion engine. However, when a valve repeats opening and closing, and when a valve seat insert is assembled to the end of the port opening of a head, the bonding structure of the valve seat in the embodiments described above may be adopted.

(4) In the first through seventh embodiments, since the valve seat insert is physically secured to the cylinder head, the bonding strength between different metals is not required so much. However, to bond the different metals firmly, and to increase heat conductivity, the valve seat insert, which is made of a sintered alloy, may contain a diffusible material and/or includes a layer of the diffusible material such as copper, zinc, tin and magnesium and alloys of them.

(5) In the third and fourth embodiments, the clearance ε may be set for zero, and the deformed metal flowing onto the outer reduced diameter surfaces 42, 52 may be enclosed. In the seventh embodiment, the cap portion 85 may be left, and the deformed metal occupying the gap around the inclined surface 83 may be enclosed. In such a state, the deformed metals occupying the outer reduced diameter surfaces 42, 52, and the inclined surface 83 are checked by another way, for example, by nondestructive testing.

According to the present invention described above, the cylinder head is deformed upon pressing the valve seat insert to the head, and the deformed metal occupies the gap around the outer reduced diameter surface of the valve seat insert, then the valve seat insert is physically secured to the head. Thereby, the valve seat insert is firmly bonded, irrespective of a state of bonding between different metals. Also, due to pressure-welding, the valve seat insert may be thinner as compared with those made by heating and press-fitting, and design requirements about dimensions and materials of the valve seat insert may be improved.

According to the present invention, the deformed metal occupying the gap around the outer reduced diameter surface of the valve seat insert is checked based on its appearance. Thereby, quality control about a state of bonding is ensured.

According to the present invention, the deformed metal occupying the gap around the outer reduced diameter surface of the valve seat insert firmly secures the valve seat insert.

According to the present invention, the deformed metal easily occupies the gap around the outer reduced diameter surface of the valve seat insert, and the outer reduced diameter surface filled with the deformed metal is easily checked.

According to the present invention, the deformed metal occupies the gap around the outer reduced diameter surface of the valve seat insert enough.

According to the present invention, initial thrust force upon pressing is reduced.

According to the present invention, the metal deformed upon friction welding secures the valve seat insert to the head.

According to the present invention, applied to the valve seat for an internal combustion engine, design requirements about dimensions and materials of the valve seat insert may be improved, for example, thickness of the valve seat insert may become a relatively thin.

Therefore, the present examples and embodiments are to be considered as illustrative and not restrictive and the invention is not to be limited to the details given herein, but may be modified within the scope of the appended claims.

What is claimed is:

1. A bonding structure of a valve seat, comprising:
   a metallic head defining a port opening;
   an annular metallic valve seat insert providing an outer reduced diameter surface on its outer circumference;
   wherein the material of the valve seat insert is harder than that of the head, the head plastically deforms upon pressing the valve seat insert toward the head, part of the deformed metal occupies any gap around the outer reduced diameter surface.

2. The bonding structure of the valve seat according to claim 1, wherein the deformed metal occupying the gap around the outer reduced diameter surface is exposed outside.

3. The bonding structure of the valve seat according to claim 2, wherein the cross section of the deformed metal occupying the gap around the outer reduced diameter surface is wedge-shaped.

4. The bonding structure of the valve seat according to claim 1, wherein the outer reduced diameter surface gradually reduces its diameter from an outermost point of the valve seat insert toward the opposite side of the head.

5. The bonding structure of the valve seat according to claim 1, wherein an inclined surface resides on the outer circumference of the valve seat insert closer to the head.

6. The bonding structure of the valve seat according to claim 5, wherein the end of the valve seat insert facing the head provides a sharp edge.

7. The bonding structure of the valve seat according to claim 1, wherein the deformed metal is produced due to friction welding such that the valve seat insert is pressed toward the head with its rotated.

8. The bonding structure of the valve seat according to claim 1, wherein the deformed metal is produced due to friction welding such that the valve seat insert is pressed toward the head with its vibrated by an ultrasonic vibrator.

9. The bonding structure of the valve seat according to claim 1, wherein the head is a cylinder head of an internal combustion engine, and the valve seat insert forms a valve seat of the cylinder head.

10. The bonding structure of the valve seat according to claim 1, wherein the valve seat insert contains a diffusible material and/or includes a layer of the diffusible material, such as copper, zinc, tin, magnesium and alloys of them.

11. A method of making a valve seat, comprising the steps of:

pressing a valve seat insert, which provides an outer reduced diameter surface, toward a head;

rotating the valve seat insert while pressing the valve seat insert; and cooling the valve seat insert and the head.

12. The method of bonding the valve seat insert to the head according to claim 11, further comprising the steps of:

stopping the valve seat insert; and pressing the valve seat insert.

* * * * *